(12) United States Patent
Huang et al.

(10) Patent No.: US 11,808,658 B2
(45) Date of Patent: Nov. 7, 2023

(54) VISUAL INSPECTOR ATTACHMENT FOR FIBER CONNECTOR CLEANERS

(71) Applicant: Panduit Corp., Tinley Park, IL (US)

(72) Inventors: Yu Huang, Orland Park, IL (US); Jose M. Castro, Naperville, IL (US); Surendra Chitti Babu, Naperville, IL (US); Andrew R. Matcha, Chicago, IL (US); Thomas M. Sedor, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 363 days.

(21) Appl. No.: 17/026,556

(22) Filed: Sep. 21, 2020

(65) Prior Publication Data

US 2021/0096039 A1    Apr. 1, 2021

Related U.S. Application Data

(60) Provisional application No. 62/907,093, filed on Sep. 27, 2019.

(51) Int. Cl.
*G01M 11/00* (2006.01)
*B08B 1/00* (2006.01)
*B08B 13/00* (2006.01)

(52) U.S. Cl.
CPC ............ *G01M 11/31* (2013.01); *B08B 1/001* (2013.01); *B08B 13/00* (2013.01); *B08B 2240/02* (2013.01)

(58) Field of Classification Search
CPC ........ G01M 11/31; B08B 1/001; B08B 13/00; B08B 2240/02
See application file for complete search history.

(56) References Cited

U.S. PATENT DOCUMENTS

| | | |
|---|---|---|
| 5,179,419 A | 1/1993 | Palmquist et al. |
| 5,809,162 A | 9/1998 | Csipkes et al. |
| 5,836,031 A | 11/1998 | Cox |
| 5,862,250 A | 1/1999 | Csipkes et al. |
| 5,898,494 A | 4/1999 | Csipkes |
| 5,956,793 A | 9/1999 | Cox |
| 5,995,212 A | 11/1999 | Dar et al. |
| 6,209,162 B1 | 4/2001 | Clairadin et al. |
| 6,209,163 B1 | 4/2001 | Clairadin et al. |

(Continued)

FOREIGN PATENT DOCUMENTS

| | | | | |
|---|---|---|---|---|
| CN | 105996995 A | * | 10/2016 | ............ A61B 1/227 |
| EP | 3482244 A1 | | 5/2019 | |

(Continued)

*Primary Examiner* — Tarifur R Chowdhury
*Assistant Examiner* — Kemaya Nguyen
(74) *Attorney, Agent, or Firm* — Christopher S. Clancy; James H. Williams; Peter S. Lee (57) ABSTRACT

Various implementations of visual inspector attachments for fiber connector cleaners are disclosed. The example fiber optic inspection module includes a camera to capture an image of an end-face, a light source to illuminate the end-face, and a first mirror that reflects light from the light source to the end-face and includes a fixed point that allows the first mirror to pivot. Alternatively, an example fiber optic inspection module includes a camera to capture an image of an end-face, a light source to illuminate the end-face, and a first mirror that reflects light from the light source to the end-face and the first mirror moves in an upward direction.

18 Claims, 11 Drawing Sheets

(56) References Cited

U.S. PATENT DOCUMENTS

| | | | |
|---|---|---|---|
| 6,466,310 B2 | 10/2002 | Nguyen et al. | |
| 6,648,980 B2 | 11/2003 | Childers et al. | |
| 6,758,605 B1* | 7/2004 | Villemaire | B08B 1/04 |
| | | | 15/210.1 |
| 6,760,534 B1 | 7/2004 | Son | |
| 6,831,738 B2 | 12/2004 | Rogers et al. | |
| 6,854,152 B2 | 2/2005 | Loder et al. | |
| 6,989,895 B2 | 1/2006 | Buzzetti | |
| 7,042,562 B2 | 5/2006 | Kiani et al. | |
| 7,216,393 B2 | 5/2007 | Sato et al. | |
| 7,243,390 B2 | 7/2007 | Fujiwara et al. | |
| 7,356,236 B1* | 4/2008 | Huang | G02B 6/385 |
| | | | 385/134 |
| 7,837,801 B2 | 11/2010 | Christopher et al. | |
| 8,325,322 B2* | 12/2012 | Hauf | G02B 7/1815 |
| | | | 355/30 |
| 8,893,346 B2 | 11/2014 | Murakami et al. | |
| 8,988,670 B2 | 3/2015 | Zhou et al. | |
| 9,151,694 B2* | 10/2015 | Wilson | G01N 21/94 |
| 9,217,688 B2 | 12/2015 | Levin et al. | |
| 9,417,444 B2 | 8/2016 | Huang et al. | |
| 9,433,978 B2 | 9/2016 | Huang | |
| 9,459,413 B2 | 10/2016 | Kida | |
| 9,528,908 B2 | 12/2016 | Wilson et al. | |
| 9,753,231 B2 | 9/2017 | Miura et al. | |
| 9,821,347 B2 | 11/2017 | Nakane | |
| 9,851,557 B2 | 12/2017 | Michaloski et al. | |
| 9,958,619 B2 | 5/2018 | Kamouchi et al. | |
| 10,006,831 B2 | 6/2018 | Higuchi et al. | |
| 10,090,914 B2* | 10/2018 | Schell | G01B 9/04 |
| 10,254,487 B2 | 4/2019 | Huang et al. | |
| 2004/0125366 A1* | 7/2004 | Kiani | G02B 6/3897 |
| | | | 356/237.1 |
| 2013/0229650 A1 | 9/2013 | Wilson et al. | |
| 2014/0268114 A1 | 9/2014 | Zhou et al. | |
| 2016/0269106 A1 | 9/2016 | Adam et al. | |

FOREIGN PATENT DOCUMENTS

| | | |
|---|---|---|
| JP | 9197182 A | 7/1997 |
| JP | 03191901 B2 | 7/2001 |
| WO | 2018009802 A1 | 1/2018 |

* cited by examiner

VISUAL INSPECTOR ATTACHMENT FOR FIBER CONNECTOR CLEANERS

CROSS-REFERENCE TO RELATED APPLICATION(S)

This application claims benefit to U.S. Provisional Patent Application No. 62/907,093, filed Sep. 27, 2019, the entirety of which is hereby incorporated by reference herein.

BACKGROUND

Proper end-face cleaning may be a part of a fiber optic installation. Fiber optic signal paths may be sensitive to dust, oil, and other contaminants on the mating face of a fiber optic connector, and contamination of a connector end-face can cause damage to the connector end-face or a mated connector. Thus, during network installation it is important to inspect and clean the connector end-face prior to connection. In many cases, visual inspection and cleaning are performed separately by an installer. Pressures to meet schedule deadlines often result in connector contamination becoming a leading cause of link failures, deployment delays, and excess cost. Visual inspection and cleaning of connector end-faces may be faster if a hand-held device existed in the market that installers could use to inspect and then clean the end-faces of fiber optic connectors without having to disconnect the connector from the hand-held device.

SUMMARY

The present disclosure provides for a new and innovative visual inspector attachment for fiber connector cleaners. An exemplary fiber optic inspection module includes a camera to capture an image of an end-face, a light source to illuminate the end-face, and a first mirror that reflects light from the light source to the end-face and includes a fixed point that allows the first mirror to pivot.

Alternatively, an exemplary fiber optic inspection module includes a camera to capture an image of an end-face, a light source to illuminate the end-face, and a first mirror that reflects light from the light source to the end-face and the first mirror moves in an upward direction.

BRIEF DESCRIPTION OF THE DRAWINGS

The following detailed description references the drawings, wherein.

DETAILED DESCRIPTION

The present disclosure relates to the field of optical network interconnection and optical assemblies and, more specifically, to apparatuses and methods to protect and maintain the cleanliness of optical fiber connector end-faces while optimizing network installation.

Fiber optic connector end-faces must be clean prior to installation. Due to any number of factors, such as lack of training or experience of installers, faulty inspection procedures, and/or simply the pressure to meet schedule deadlines, connector end-faces may still be contaminated during installation. This has made connector contamination a cause of link failures, deployment delays, and excess cost.

The need to meet tight schedules has only exacerbated the issues. Using separate tools for inspection and cleaning costs additional time and resources during an installation. A device that can do both, cleaning and inspecting without disconnecting or realigning the connector under test and where the operation can be repeated until the required degree of cleanliness can be achieved is unavailable in the market. There is a need for such a device, which can enable a more reliable installation of optical interconnects in data centers while reducing time and cost savings.

These and other objects, features, and advantages of the present disclosure will become apparent to those having ordinary skill in the art upon reading this disclosure.

Reference will now be made to the accompanying drawings. Wherever possible, the same reference numbers are used in the drawings and the following description to refer to the same or similar parts. It is to be expressly understood, however, that the drawings are for illustration and description purposes only. While several examples are described in this document, modifications, adaptations, and other implementations are possible. Accordingly, the following detailed description does not limit the disclosed examples. Instead, the proper scope of the disclosed examples may be defined by the appended claims.

Figure 1:
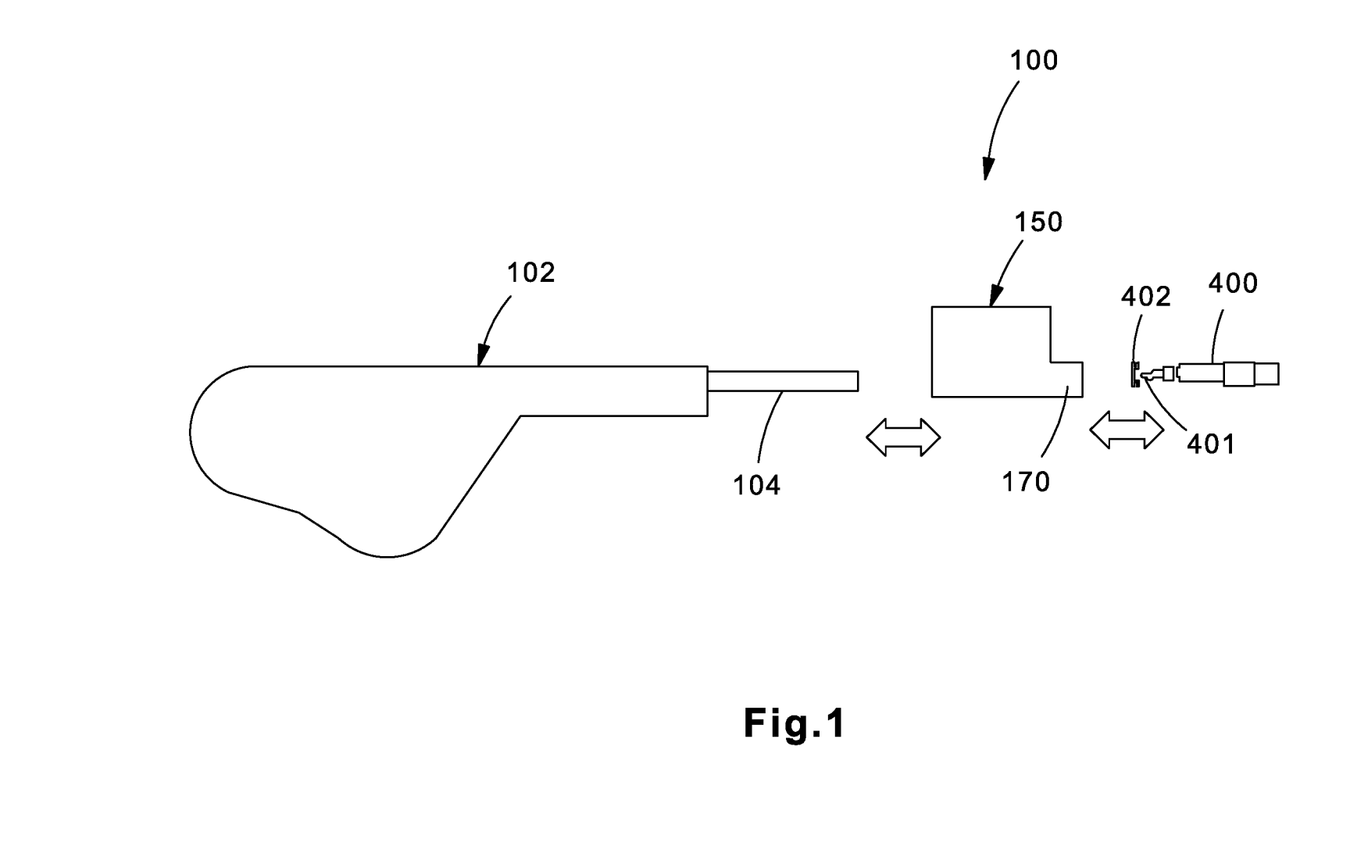
FIG. 1 is a side view for an inspection and cleaning system for inspecting and cleaning a connector according to an embodiment of the present disclosure, where the inspection and cleaning system includes a fiber optic inspection module and a cleaning device.
Figure 2:
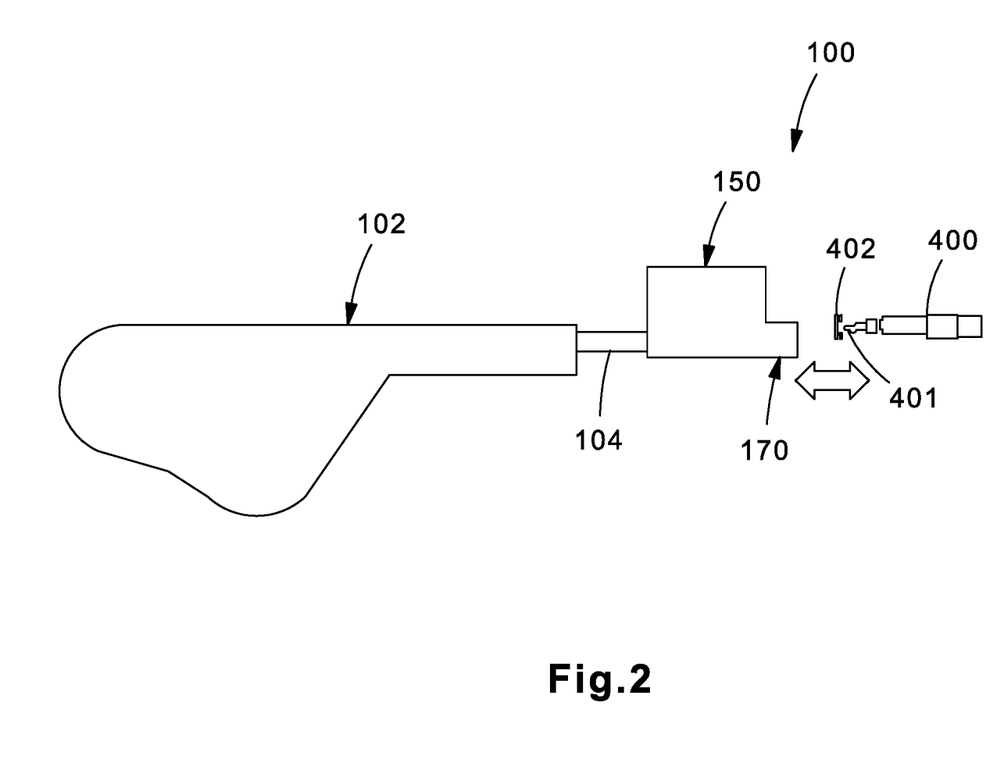
FIG. 2 is a side view of the system from FIG. 1 where the fiber optic inspection module and the cleaning device are in a connected state, according to an exemplary embodiment of the present disclosure.

FIGS. 1 and 2 show a side view of a system diagram providing an overview of an exemplary inspection and cleaning system 100. The inspection and cleaning system 100 includes a fiber optic inspection module 150 and a cleaning device 102, where the cleaning device 102 includes a probe 104. The cleaning device 102 is used to clean a connector 400 (the connector 400 could be a fiber optical connector or adapter), and the fiber optic inspection module 150 is used to inspect the connector 400. The fiber optic inspection module 150 is a portable form factor visual inspection module configured to be attachable to standard fiber optic cleaners, such as the cleaning device 102. The cleaning device 102 may be a fabric or tape-based cleaning device. As the cleaning feature (e.g., fabric or tape) moves using pay-off and/or take-up reels during a cleaning process, it will wipe and clean an end-face 401 of the connector 400. Although the described embodiments may generally identify the connector 400 as the component being inspected and/or cleaned by the inspection and cleaning system 100, other specific components such as the adapter components 402 and/or the connector end-face may be inspected and/or cleaned by the inspection and cleaning system 100.

FIG. 1 shows the fiber optic inspection module 150 and the cleaning device 102 of the inspection and cleaning system 100 spaced apart prior to the two components being assembled (i.e., connected) together. FIG. 2 shows the fiber optic inspection module 150 and the cleaning device 102 assembled together in an assembled state ready for operation. The probe 104 is connected to the fiber optic inspection module 150 in this assembled state. After the cleaning device 102 and the fiber optic inspection module 150 are attached, they may operate as a single integrated tool that provides both cleaning and inspection functionalities without the need to disconnect the connector 400. Once the fiber optic inspection module 150 and the cleaning device 102 are connected, the connector 400 is moved towards (and eventually into) a connector adapter 170 portion of the fiber optic inspection module 150 to be inspected and cleaned as desired.

Figure 3:
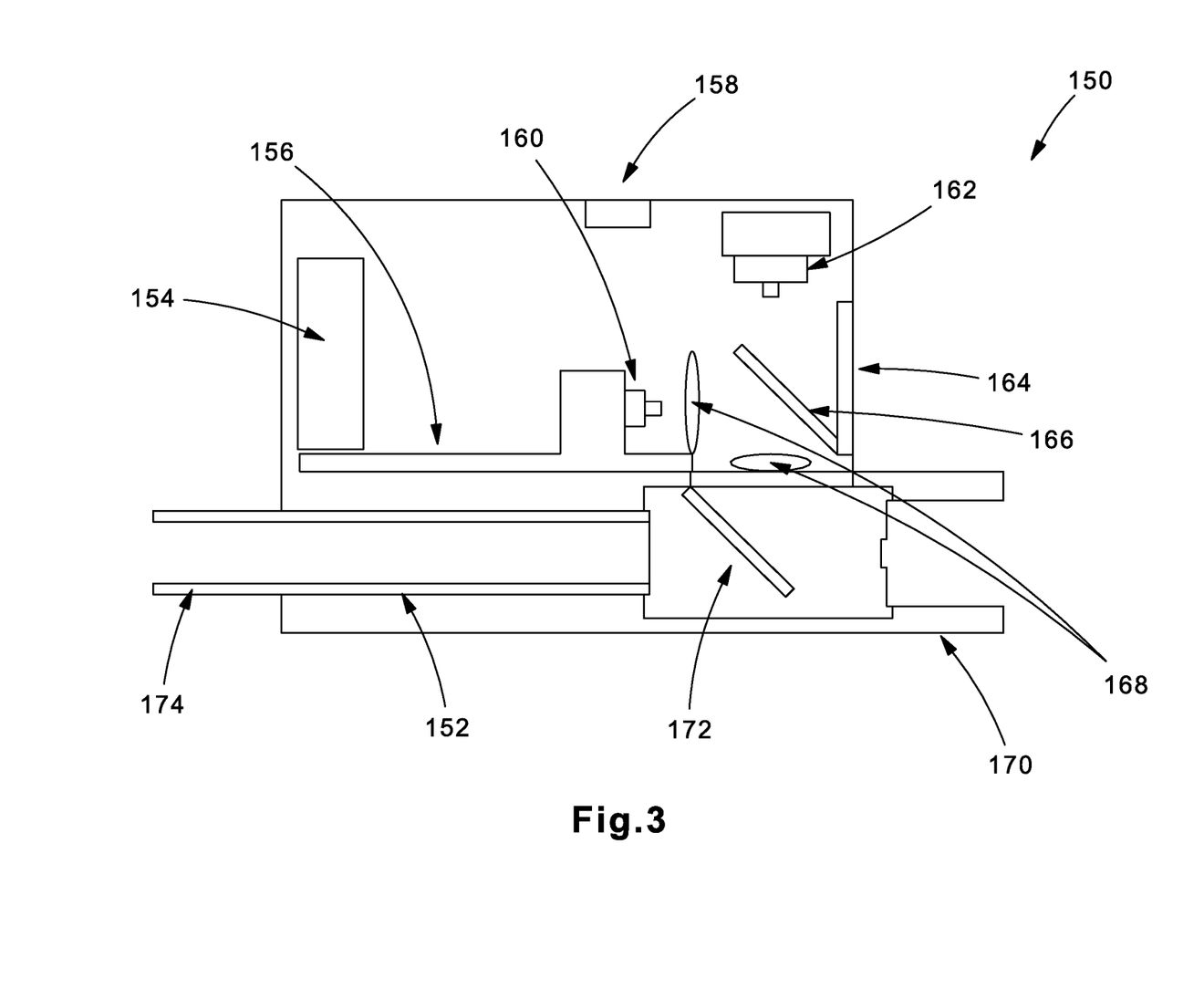
FIG. 3 is a system diagram for the fiber optic inspection module, according to an exemplary embodiment of the present disclosure.
Figure 4:
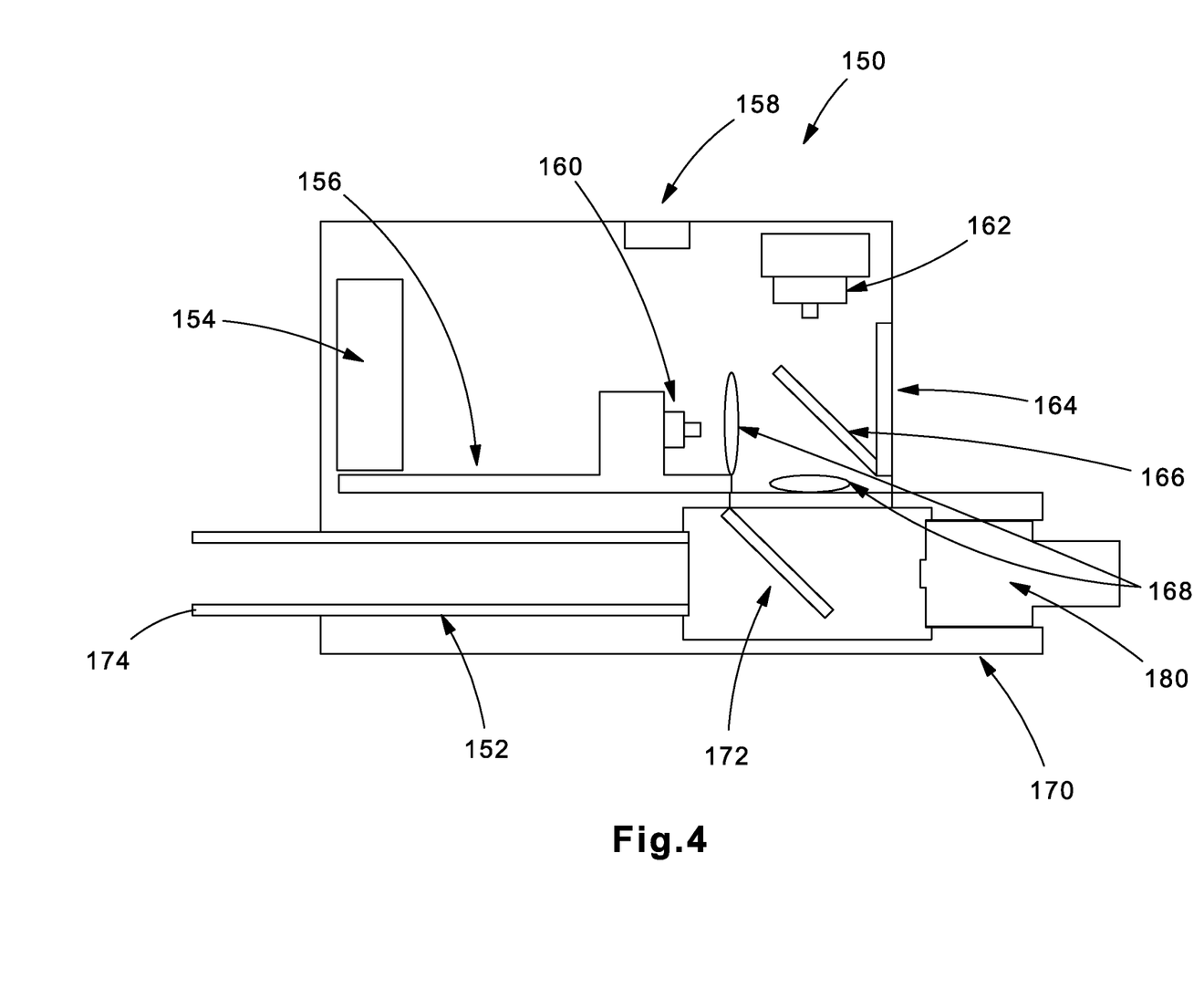
FIG. 4 is the system diagram for the fiber optic inspection module from FIG. 3 further including an external adapter, according to an exemplary embodiment of the present disclosure.

FIG. 3 is an internal side view of the components comprising the fiber optic inspection module 150, and FIG. 4 is an internal side view of the components comprising the fiber optic inspection module 150 further including an external adapter 180. The components shown in FIG. 3 are provided for exemplary purposes, as the fiber optic inspection module may include additional, or fewer, components according to other embodiments, while certain other components may not be expressly illustrated.

The fiber optic inspection module 150 includes a light source 162, a lens set 168 comprising at least two lenses, a connector adapter 170, a first mirror 172, a cleaner adapter 152, a battery 154, a computing system 156, an imaging system 160, and an indicator 158. According to some alternative embodiments, the fiber optic inspection module 150 may further include a second mirror 166, an adapter sleeve 174, a light absorber 164, and an external adapter 180, as shown in FIG. 4.

The light source 162 emits light that is used to illuminate (at a desired wavelength of interest—e.g., blue LED or laser) the end-face 401 of the connector 400 when the connector 400 is inserted into the connector adapter 170 (or the external adapter 180 when it is included in the fiber optic inspection module 150). The light emitted from the light source 162 is partially transmitted by the second mirror 166 towards the lenses included in the lens set 168. The first mirror 172 receives this light and reflects it towards the end-face 401 of the connector 400 under test. Using this system, at least one lens in the lens set 168 is used to focus light from the light source 162 to the end-face 401 of the connector 400. The lenses in the lens set 168 are also used to transfer the light reflected from the end-face 401 of the connector back to the imaging system 160. The lenses in the lens set 168 are positioned and configured within the fiber optic inspection module 150 to provide an optical magnification feature to detect debris and/or other contamination on the end-face 401 of the connector 400 (e.g., this is equivalent magnification to an optical microscope, 100×, 200×, or 400×).

The imaging system 160 is a camera or other device comprising an image sensor (or more than one camera or image sensor). The image sensor included in the imaging system 160 may be a CMOS sensor or a CCD sensor. The imaging system 160 captures an image of the connector end-face 401 at desired wavelengths of interest (e.g., blue spectral region, UV spectral region, or near infra-red spectral (NIR) region).

The computing system 156 includes hardware, software, and/or circuitry to control and operate the fiber optic inspection module 150 according to the features described herein. The computing system 156 may include wireless network interface(s) to enable the fiber optic inspection module 150 to communicate with an external computing device using known wireless communication protocols such as Bluetooth, WiFi, and/or Near Field Communication (NFC). The computing system 156 may include machine readable memory configured to store machine readable instructions, and one or more processors and/or controllers that, when executing the machine readable instructions stored on the memory, cause the fiber optic inspection module 150 to control the imaging system 160, control the light source 162, perform image analysis on images captured of the end-face 401, and/or perform wireless communication with a mobile device (as described in more detail below), as well as other functionalities of the device.

According to some embodiments, the computing system 156 on the fiber optic inspection module 150 may analyze the captured images of the end-face 401 received from the imaging system 160 directly to determine whether a contamination exists on the end-face 401. According to other alternative embodiments, the computing system 156 may include the wireless network interface(s) and communication devices for communicating with an external computing device using wireless signals to transmit the captured images of the end-face 401 so that the mobile device performs the image analysis and transmits the results of whether a contamination was identified back to the fiber optic inspection module 150. The external computing device may be a mobile computing device (e.g., smartphone, tablet, or laptop) being handled by the on-site installer, or an off-site computing station (e.g., cloud computing server computer or work station) having greater computing resources to apply image analysis on the captured of the end-face 401 and identify a contamination with greater accuracy.

In addition to the image analysis to determine whether a contamination exists on the end-face 401 of the connector 400, a degree of contamination identified from the image analysis may be compared with the limits defined by industry standards (e.g., IEC 61300-3-35 Basic Test and Measurement Procedures Standard for Fiber Optic Interconnecting device and Passive Components) according to some embodiments. Then based on this analysis, the fiber optic inspection module 150 may be configured to provide a pass/fail indication signal based on the analysis of the captured image. For example, when the level of contamination identified from the captured images is determined to be below the compared industry standard, a fail indication signal is presented. On the other hand, when the level of contamination identified from the captured images is determined to meet or exceed the compared industry standard, a pass indication signal is presented.

The indicator 158 may be an audible indicator (e.g., speaker for transmitting an alarm sound), or a visual indicator (e.g., LED light or LCD display screen with or without touch screen capabilities). The results of the image evaluation may be presented via the indicator 158. A passing signal may be shown as a green light, check mark, predetermined message, or other indication perceivable via the senses. If the connector 400 passes, the operator may move on and test the next connector or adapter.

A fail condition may trigger additional signals or algorithms to clean the connector 400 and/or may illuminate the indicator 158. If not done automatically, the operator will clean the end-face of the connector. To do this, the operator pushes the probe 104 into the cleaner adapter 152 of the fiber optic inspection module 150. The pressure of the probe 104 triggers the movement of the cleaning tape in the cleaning device 102. The movement of the tape over the connector end-face cleans the connector (e.g., as shown in FIG. 5c). This procedure may be repeated until the connector passes the required/desired degree of cleanliness, the cleaning device 102 runs out of tape, or it is determined that the connector 400 is unable to be properly cleaned. A report with test data (time, operator, etc.) and data related to the connector 400's status and captured images may be stored on a memory in the inspection module 150 or transmitted for storage on a memory of an external device. In addition or alternatively, this data may be transmitted for storage in the cloud.

The light absorber 164 may be included in the fiber optic inspection module 150 to eliminate spurious light that can degrade the signal to noise ratio of the fiber optic inspection module 150. In an alternate embodiment, the light absorber 164 may be replaced with a lens to provide external light that can facilitate the use of the fiber optic inspection module 150 in dark areas inside a data center or LAN (e.g., inside cabinets). The battery 154 is included to power components of the fiber optic inspection module 150 such as the computing system 156, the light source 162, the imaging system 160, and/or the indicator 158.

For the fiber optic inspection module 150 to operate with different embodiments of the cleaning device 102, the fiber optic inspection module 150 may be adapted to utilize different versions of the cleaner adapter 152 and the adapter sleeve 174 to accurately mate with the cleaning device 102. Therefore, the dimensions of the cleaner adapter 152 may depend on the type of connector 400 the cleaning device 102 is designed to clean (e.g., FOCIS-5 for the MTP/MPO fiber optic connector intermate ability standard). The adapter sleeve 174 may be an optional removable component that is placed in the cleaner adapter 152. The adapter sleeve 174 is removable and may be designed to be compatible to operate with a wider plurality of cleaning tools of different internal geometries.

Similarly, the shape and dimension of connector adapter 170 may be adjusted, adjustable, and/or exchangeable for different types of connectors and adapters. For mating connectors, the connector adapter 170 has a concave shape with the specific dimensions required to accept a connector. For mating an adapter already attached to a connector, connector adapter 170 will have a protruding shape to go inside the adapter. Additionally, the external adapter 180 may be attached to the fiber optic inspection module 150 to inspect optical receptacles or adapters used in cassettes. An additional lens may be added to the external adapter 180 to compensate for an increase in working distance between the end-face 401 of the connector 400 and the imaging system 160.

Figure 5A:
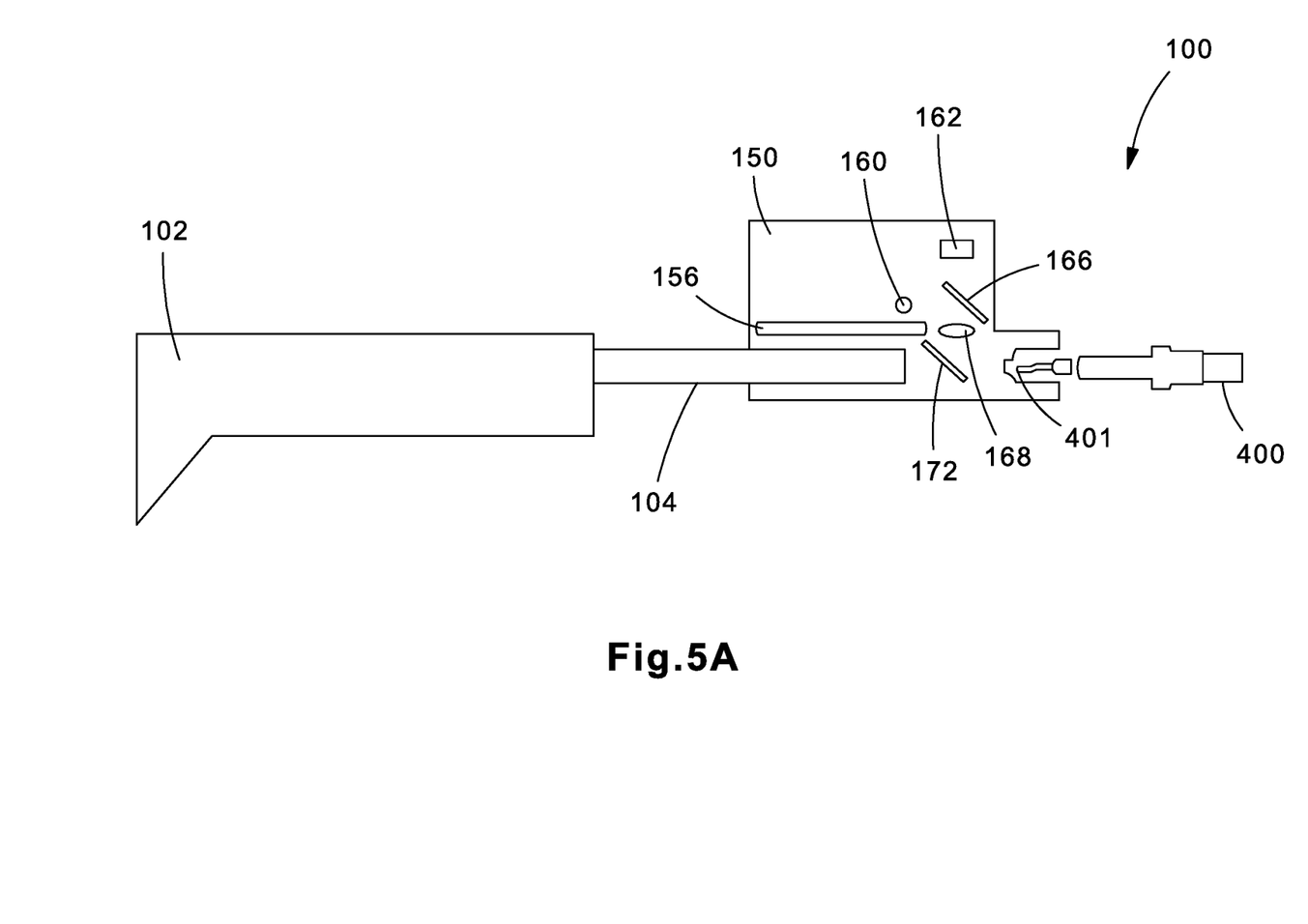
FIG. 5A shows the fiber optic inspection module in FIG. 3 interacting with a cleaning tool in a first mode, according to an exemplary embodiment of the present disclosure.
Figure 5B:
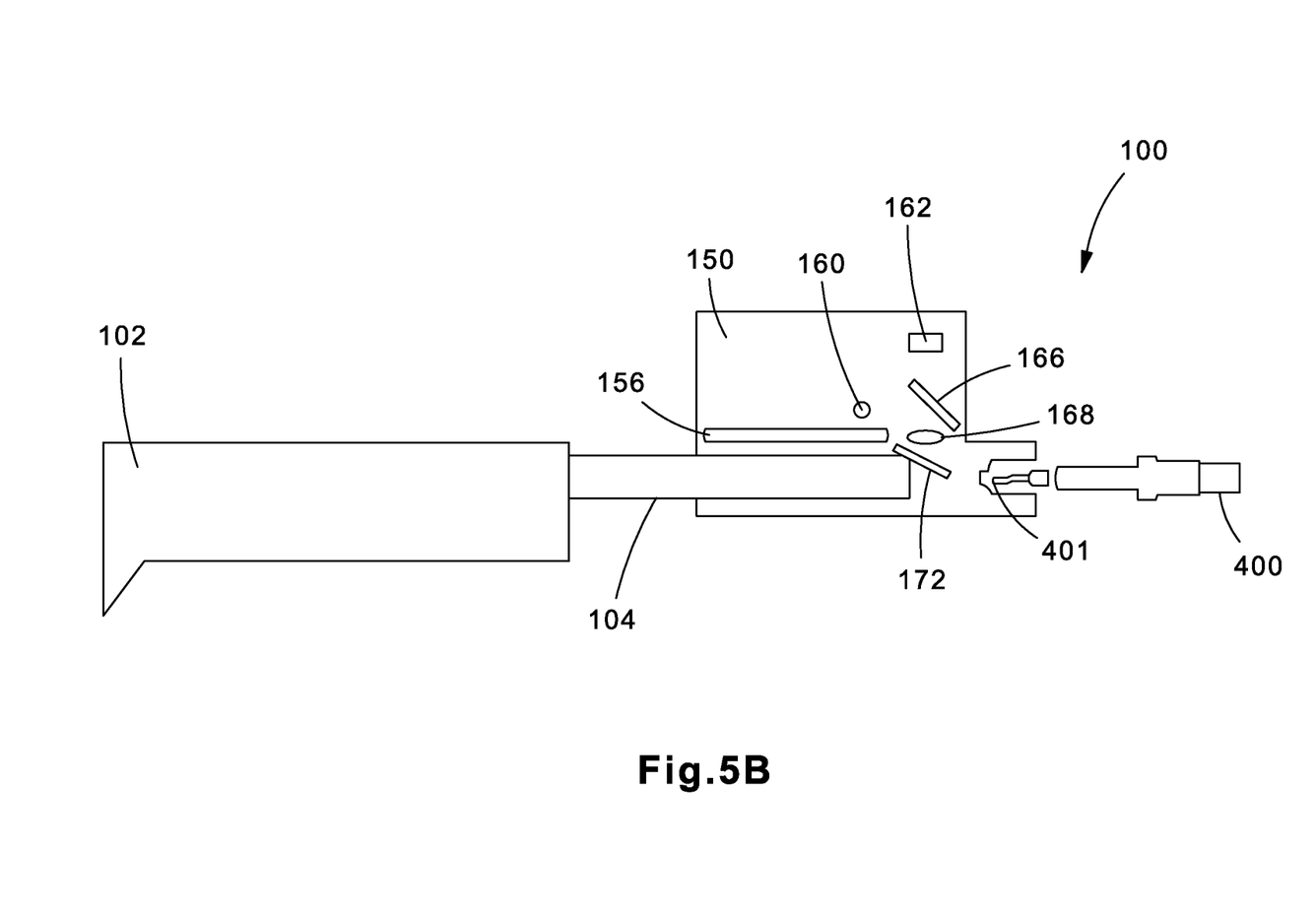
FIG. 5B shows the fiber optic inspection module in FIG. 3 interacting with the cleaning tool in a second mode, according to an exemplary embodiment of the present disclosure.
Figure 5C:
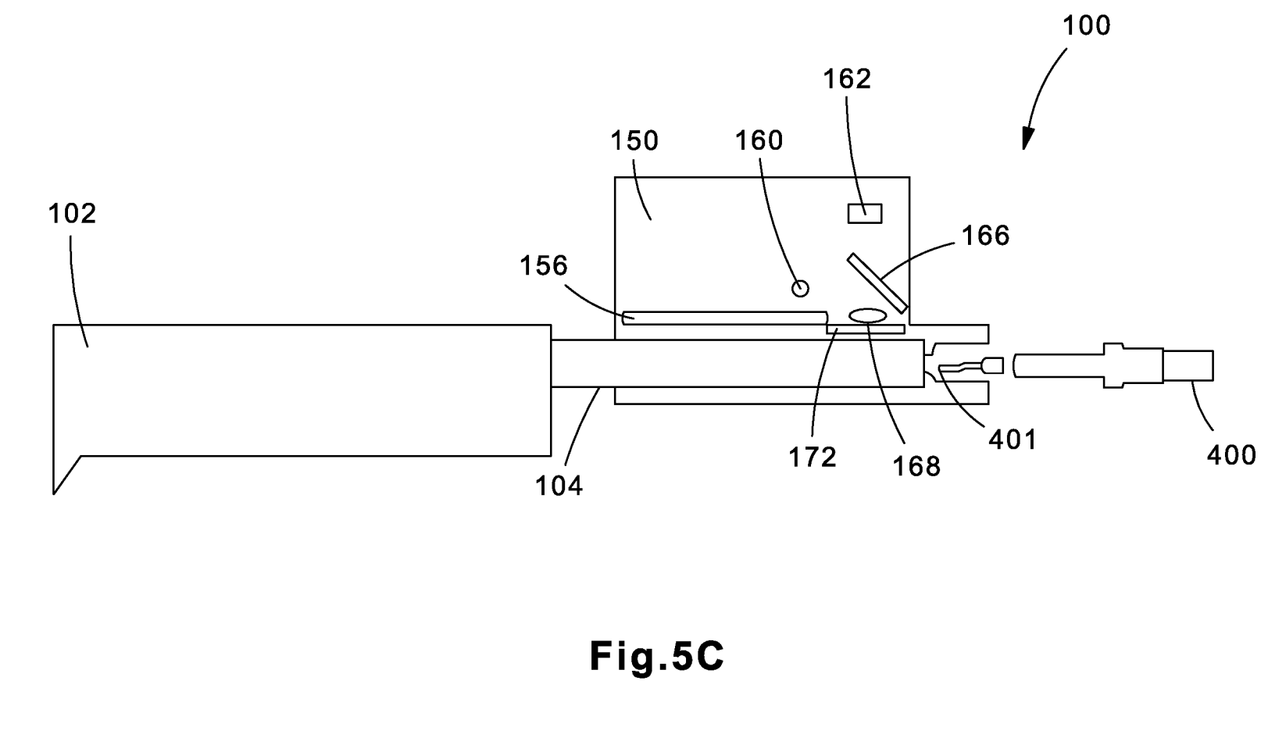
FIG. 5C shows the fiber optic inspection module in FIG. 3 interacting with the cleaning tool in a third mode, according to an exemplary embodiment of the present disclosure.

FIGS. 5A to 5C show side views of the inspection and cleaning system 100 operating in three distinct modes. Before beginning the operational modes, an operator may verify that the fiber optic inspection module 150 is compatible with the cleaning device 102. Once verified, the operator may connect the cleaning device 102 to the fiber optic inspection module 150.

In FIG. 5A, the inspection and cleaning system 100 is configured in an inspection mode where the cleaning device 102 and fiber optic inspection module 150 are attached together. When the fiber optic inspection module 150 is ready to operate, a visual (or audible) indication may be provided by the indicator 158 (e.g., such as a yellow light) showing the system 100 is ready to inspect and clean.

The connector 400 is then inserted into the fiber optic inspection module 150, as seen in FIG. 5A, for evaluation. At this point when the connector 400 has been inserted into the fiber optic inspection module 150, the end-face 401 of the connector 400 is imaged and evaluated during the inspection mode. The first mirror 172 is tilted approximately 45 degrees, enabling the transmission of light from the light source 162 to the end-face 401 of the connector 400. The visual components of the fiber optic inspection module 150 detect reflected light from the end-face 401 of the connector 400 and may autofocus and capture the image of the end-face 401. The fiber optic inspection module 150 evaluates the degree of focus, detects the connector type, and may ask the user to readjust or reinstall the connector 400 when additional images are needed to detect contamination. In an alternate embodiment, the user may activate an external control (e.g., button, trigger, mechanical or electrical remote) using a mobile device to begin inspection and/or cleaning.

The fiber optic inspection module 150 may use the on-board computing system 156 or an external processor (remote device) to evaluate the captured image and report the degree of cleanliness by providing a pass/fail signal. If the connector 400 passes, the indicator 158 presents a passing signal (e.g., a green LED), indicating that the operator may remove the connector 400. If the connector 400 fails the test, the indicator 158 presents a fail signal (e.g., a red LED). If the connector 400 fails the test, the operator may clean the connector 400 again. To do so, as shown in FIG. 5b, the user presses the cleaning device 102 towards the fiber optic inspection module 150, causing the mirror to move.

The first mirror 172 is movable in the form of tilting, translation, or a combination of tilting and translation during a transition mode, as shown by the exemplary tilting/pivoting of the first mirror 172 in FIG. 5B. During the imaging process, the first mirror 172 is situated at a tilt of approximately 45 degrees relative to the optical axis of the system. To clean the connector 400, the operator presses the cleaning device 102 against the fiber optic inspection module 150. The pressure moves the probe 104, which holds the cleaning head of the cleaning device 102, into the fiber optic inspection module 150 guided by the cleaner adapter 152 and/or the adapter sleeve 174. The moving probe 104 then triggers a mechanism to displace the first mirror 172.

Finally in a cleaning mode, the first mirror 172 or a holder of the first mirror 172 is pushed by the probe 104 and rotated up to be approximately zero degrees horizontal as shown in FIG. 5C, thus enabling the probe 104 to reach the end-face 401 of the connector 400. As seen in FIG. 5B and FIG. 5C, this mechanism of the fiber optic inspection module 150 enables the probe 104 to push against the back of the first mirror 172, causing the first mirror 172 to pivot (i.e., rotate) about a fixed point. The rotation of the first mirror 172 about the fixed point may be accomplished by the first mirror 172 being attached to a type of hinge, door, or other rotatable device. The fixed point is located at the top of the first mirror 172. As shown by the transition from FIGS. 5A to 5C, the top of the first mirror 172 stays in the same spot while the bottom portion of the first mirror 172 rotates upward as the probe 104 abuts against the first mirror 172 and travels further into the fiber optic inspection module 150. As shown in FIG. 5C, in the cleaning mode the first mirror 172 is completely tilted or moved out of the path of the probe 104 so that the probe 104 may reach the end-face 401 of the connector 400. This movement opens a path for the probe 104 to clean the end-face 401 of the connector 400.

In an example, the probe 104 may contact a non-reflective side (back side) of the first mirror 172. Alternatively, a mechanism by movement of the probe 104 with respect to the fiber optic inspection module 150 (or the adapter sleeve 174 or the cleaner adapter 152) can move the first mirror 172 without directly contacting the back side of the first mirror 172.

In an alternate embodiment, the mirror hinge/door pivot may be activated without physical contact on the back of the first mirror 172. For example, the insertion of the probe 104 further into the fiber optic inspection module 150 may cause a door or trigger to be moved out of the path of the probe 104 before the first mirror 172 is contacted by the probe 104. The door/trigger may be connected to the first mirror 172 through a belt coupler that will cause the first mirror 172 to pivot due to the probe 104's contact with the door/trigger. Similarly, the first mirror 172 may be moved using gears, a bar attaching between a door/trigger and the first mirror 172, other mechanical configurations or electronics/a motor. In a further alternate embodiment, the adapter sleeve 174 may trigger the mechanism that displaces the first mirror 172.

Figure 6A:
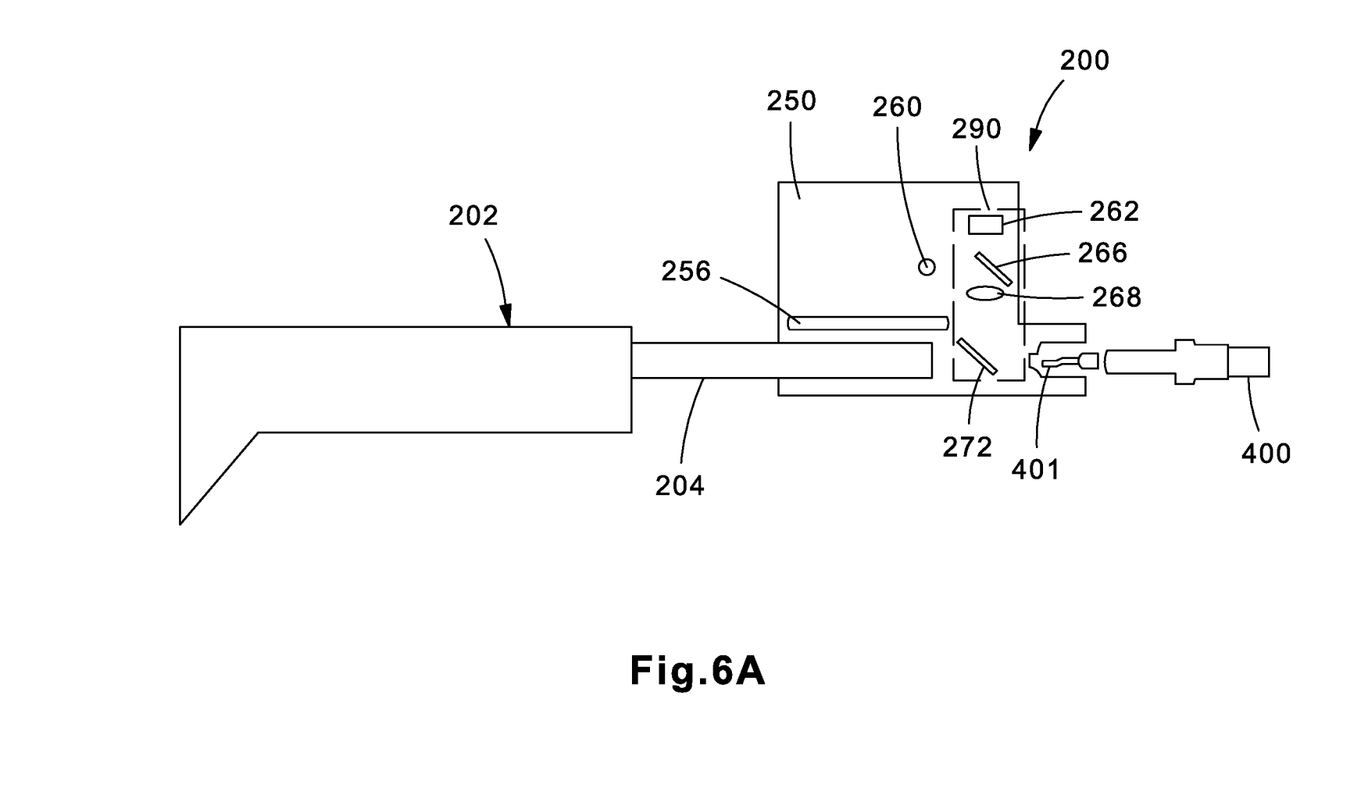
FIG. 6A shows a system diagram for a fiber optic inspection module according to an alternative embodiment, where the fiber optic inspection module is shown interacting with a cleaning tool according to the first mode.
Figure 6B:
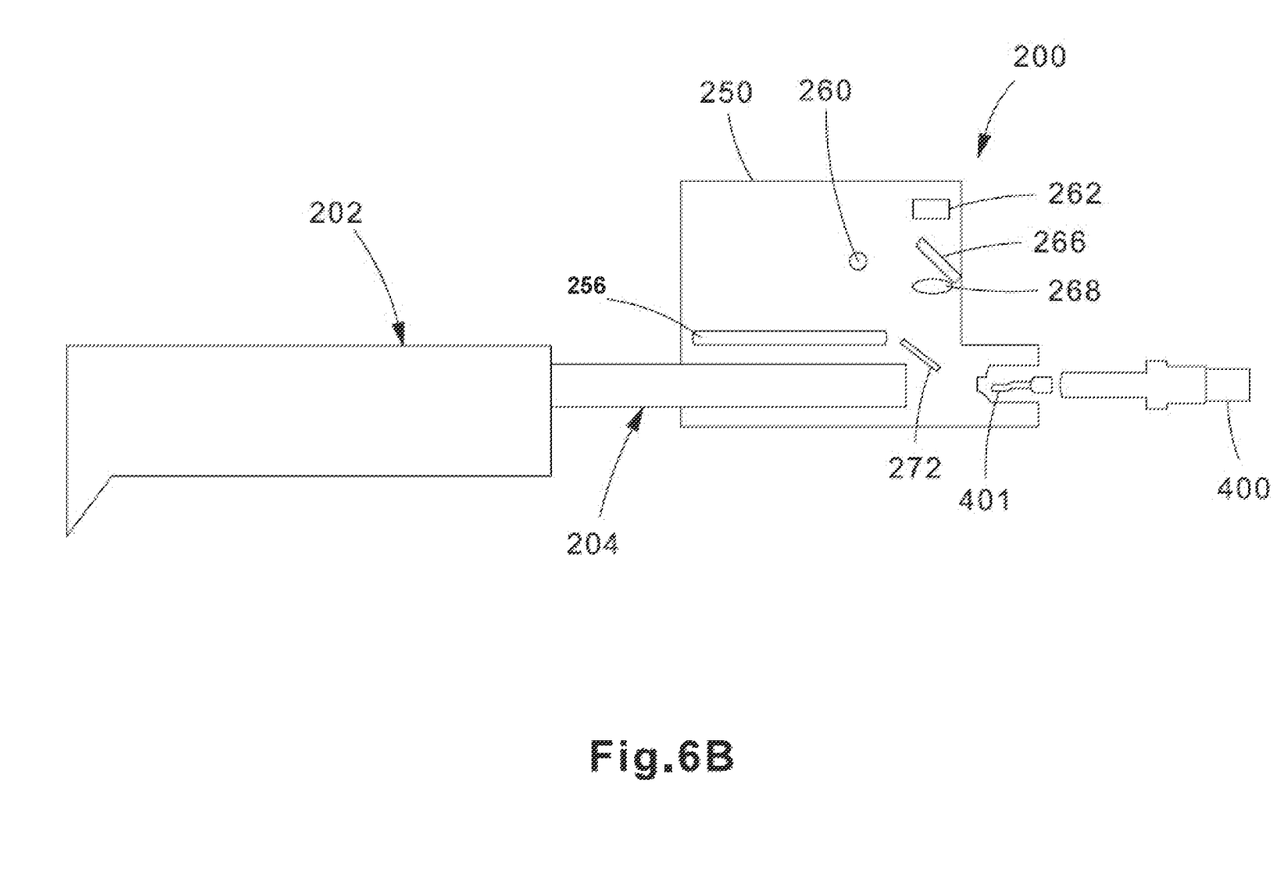
FIG. 6B shows the fiber optic inspection module of FIG. 6A interacting with the cleaning tool according to the second mode.
Figure 6C:
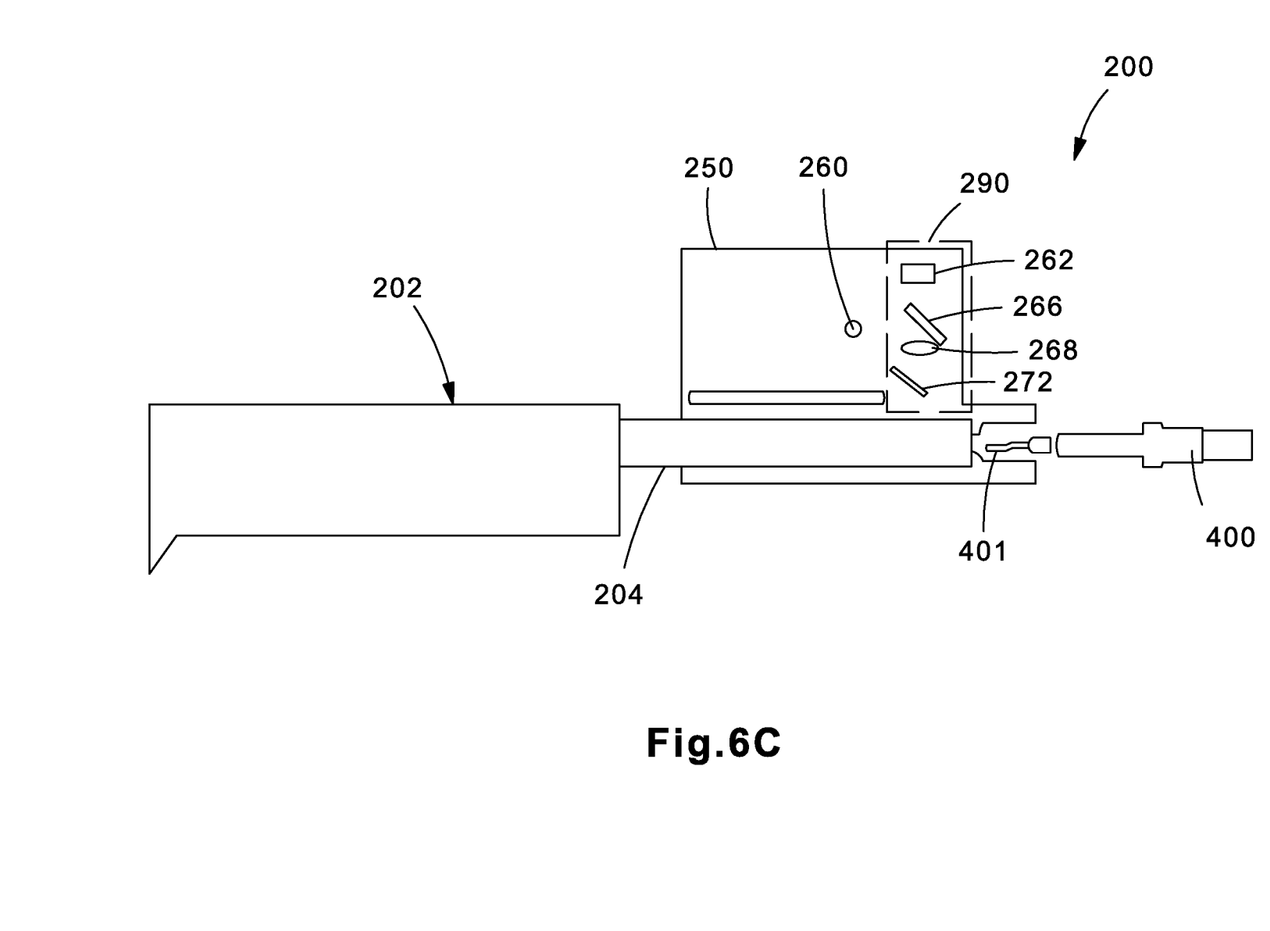
FIG. 6C shows the fiber optic inspection module of FIG. 6A interacting with the cleaning tool according to the third mode.
Figure 7:
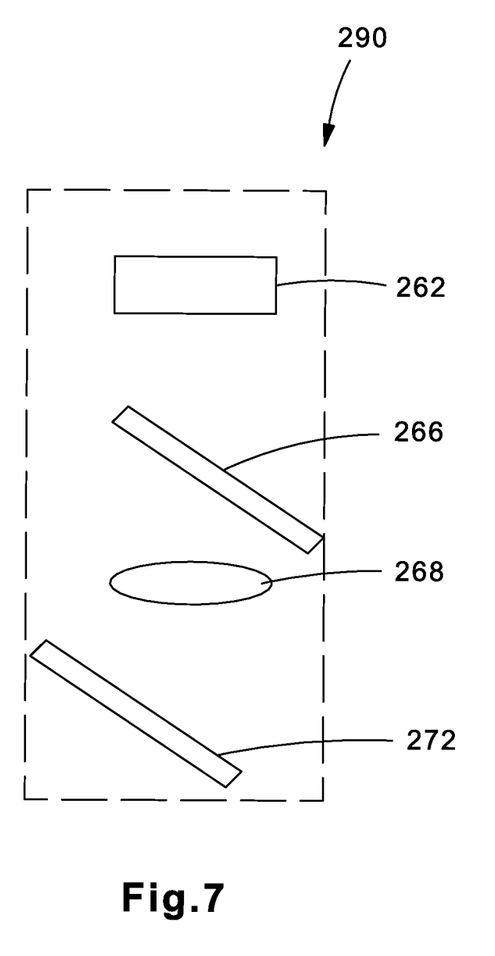
FIG. 7 is an enlarged view of the imaging components included in a submodule of components from the fiber optic inspection module shown in FIG. 6A.

FIGS. 6A to 6C show an exemplary cleaning and inspection system 200 operating in various operational modes according to an alternative embodiment that includes an alternate mechanism and method of moving the first mirror 272. The cleaning and inspection system 200 operates to inspect and clean the end-face 401 of the connector 400. The cleaning and inspection system 200 includes a cleaning device 202 that includes a probe 204. The cleaning and inspection system 200 further includes an inspection module 250. The inspection module 250 includes computing system 256, a camera 260, a light source 262, a first mirror 272, a second mirror 266, and a lens 268. In this example, the first mirror 272, the second mirror 266, the light source 262 and the lens 268 form a submodule 290, as indicated by the portion A illustrated in FIG. 6A and also provided in the enlarged view of FIG. 7. According to the cleaning and inspection system 200, when the probe 204 is advanced into the inspection module 250, the probe 204 actuates a trigger or intersects with the submodule 290 which causes the submodule 290 to be shifted upward, out of the path of the probe 204. This provides a path for the probe 204 to clean the end-face 401 of the connector 400.

In an embodiment, the submodule 290 may be shifted upward in a mechanical fashion. For example, the probe 204 or a portion of the inspection module 250 may be slidable and have an angled surface. The submodule 290 may also have an angled surface. When the two angled surfaces interact, the angled surface on the probe 204 and/or the angled surface of the inspection module 250 may push the submodule 290 in an upward direction. Alternatively, the submodule 290 may move upwards using other mechanical means, gears, motors, or electronics, which may require the use of a trigger (such as a button, door, etc.). In a further alternate embodiment, the movement of the submodule 290 is caused by a remote or mobile device triggering the movement of the submodule 290.

The described inspection module provides an apparatus and method for fast inspection and cleaning of optical connectors and adapters. The apparatus can inspect and clean optical interconnects or patch cord connector end-faces without the need of manually removing and installing the connector from an inspection tool to a separate cleaner device. Alternatively, the apparatus can inspect and clean patch panels or cassette adapters without removing the adapter from the inspection tool to another cleaning tool. The disclosed device may be applied to several types of single, duplex or parallel optical connectors such as LC, SC, CS, SN, MTP/MPO. It may also be used with their connector adapters.

Note that while the present disclosure includes several embodiments, these embodiments are non-limiting, and there are alterations, permutations, and equivalents, which fall within the scope of this disclosure. Additionally, the described embodiments should not be interpreted as mutually exclusive, and, should instead be understood as potentially combinable if such combinations are permissive. It should also be noted that there may be alternative ways of implementing the embodiments of the present disclosure. It is therefore intended that claims that may follow be interpreted as including all such alterations, permutations, and equivalents as fall within the true spirit and scope of the present disclosure.

What is claimed is:

1. A fiber optic inspection module, comprising:
    a camera configured to capture an image of an end-face of a fiber optic connector; a cleaner adapter forming a path;
    a light source configured to illuminate the end-face; and
    a first mirror configured to:
        reflect light from the light source to the end-face; and
        pivot between a first position and a second position, wherein in the position the first mirror is positioned to block, at least in part, the path between a probe and the end-face, and wherein in the second position the first mirror is rotated to open the path between the probe and the end-face to enable the probe to access the end-face.

2. The fiber optic inspection module of claim 1, further comprising a lens set including at least one lens.

3. The fiber optic inspection module of claim 2, wherein the lens set is included in the transfer of the image of the end-face to the camera.

4. The fiber optic inspection module of claim 2, further comprising a second mirror, wherein the light from the light source is reflected by the second mirror towards the lens set.

5. The fiber optic inspection module of claim 1, wherein a first end of the path is formed, at least in part, by the cleaner adapter configured to receive the probe.

6. The fiber optic inspection module of claim 5, wherein the cleaner adapter is configured to hold an adaptor sleeve.

7. The fiber optic inspection module of claim 5, wherein a second end, opposite the first end, of the path is formed, at least in part, to receive a connector adapter configured to hold the fiber optic connector.

8. The fiber optic inspection module of claim 1, further comprising:

a processor; and a memory configured to store machine-readable instructions that, when executed by the processor, causes the processor to control the camera.

9. The fiber optic inspection module of claim 8, wherein the memory is further configured to store machine-readable instructions that, when executed by the processor, causes the processor to perform image analysis on the image of the end-face.

10. The fiber optic inspection module of claim 1, further comprising:

a wireless communication device included in a computing system, the wireless communication device configured to communicate with at least one external device.

11. The fiber optic inspection module of claim 1, further comprising:

a battery configured to power the camera.

12. The fiber optic inspection module of claim 1, further comprising:

a visual indicator configured to provide notification of a condition of the end-face based on an analysis of the image of the end-face.

13. The fiber optic inspection module of claim 12, wherein the condition is at least one of a pass condition or a fail condition.

14. The fiber optic inspection module of claim 12, wherein the visual indicator is one of an LED screen or an LCD screen.

15. The fiber optic inspection module of claim 1, further comprising:

an absorber configured to eliminate spurious light.

16. The fiber optic inspection module of claim 1, wherein the light source is one of an LED or a laser.

17. The fiber optic inspection module of claim 1, wherein the pivot of the first mirror about the fixed point is perpendicular to a movement of a probe end of a cleaning device inserted into the fiber optic inspection module.

18. The fiber optic inspection module of claim 1, wherein the first mirror is tilted 45 degrees relative to an optical axis of the fiber optic inspection module.

* * * * *